United States Patent
Polson et al.

(10) Patent No.: US 11,616,998 B2
(45) Date of Patent: Mar. 28, 2023

(54) TEMPORARY TELEVISION RIGHTS SCHEME GRANT BASED ON UNCERTAIN MEASURABLE EVENTS

(71) Applicant: DISH Network L.L.C., Englewood, CO (US)

(72) Inventors: Matthew Polson, Castle Rock, CO (US); Robert Sadler, Denver, CO (US); James Wilde, Denver, CO (US); Timothy Meyer, Denver, CO (US); Christopher Kuhrt, Englewood, CO (US); Shaun Ryan, Colorado Springs, CO (US); Jesse Montgomery, Denver, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 17/362,933

(22) Filed: Jun. 29, 2021

(65) Prior Publication Data
US 2022/0417574 A1    Dec. 29, 2022

(51) Int. Cl.
| | |
|---|---|
| H04N 21/258 | (2011.01) |
| H04N 21/4627 | (2011.01) |
| G07F 17/32 | (2006.01) |
| H04N 21/254 | (2011.01) |
| H04N 21/239 | (2011.01) |
| H04N 21/478 | (2011.01) |
| H04N 21/24 | (2011.01) |

(52) U.S. Cl.
CPC ...... *H04N 21/2541* (2013.01); *G07F 17/3288* (2013.01); *H04N 21/2396* (2013.01); *H04N 21/2407* (2013.01); *H04N 21/25875* (2013.01); *H04N 21/4627* (2013.01); *H04N 21/478* (2013.01)

(58) Field of Classification Search
CPC ........... H04N 21/2541; H04N 21/2396; H04N 21/2407; H04N 21/25875; H04N 21/478; G07F 17/3288
See application file for complete search history.

(56) References Cited

U.S. PATENT DOCUMENTS

| | | | |
|---|---|---|---|
| 7,985,134 B2 * | 7/2011 | Ellis | H04N 21/47214 377/5 |
| 8,282,468 B2 * | 10/2012 | Huntley | G07F 17/3281 463/25 |
| 9,854,317 B1 | 12/2017 | Abboa-Offei et al. | |

(Continued)

*Primary Examiner* — Pinkal R Chokshi
(74) *Attorney, Agent, or Firm* — Kilpatrick Townsend & Stockton, LLP

(57) ABSTRACT

Various arrangements for authorizing content viewing are detailed herein. Sports wager data corresponding to a sports wager placed by a user may be provided to a television service provider system. The television service provider system can perform a lookup action to determine a content event based on the sports wager data. In response to the received sports wager data, a user account may be authorized using a rights scheme for access to a television channel on which the content event is scheduled to be broadcast. The television service provider system may deauthorized the user account for access to the television channel by removing the rights scheme such that access to the television channel on which the content event was broadcast is blocked after the event.

20 Claims, 6 Drawing Sheets

(56) References Cited

U.S. PATENT DOCUMENTS

| | | | |
|---|---|---|---|
| 2001/0037211 A1* | 11/2001 | McNutt | G07F 17/3288 463/29 |
| 2002/0054088 A1* | 5/2002 | Tanskanen | G06Q 40/04 348/E7.071 |
| 2008/0064490 A1* | 3/2008 | Ellis | H04N 21/4821 463/25 |
| 2012/0231890 A1 | 9/2012 | Junkin et al. | |
| 2014/0068659 A1* | 3/2014 | Vasilikakis | G07F 17/3262 725/60 |
| 2015/0379816 A1 | 12/2015 | Hayon | |
| 2018/0167656 A1* | 6/2018 | Ortiz | G07F 17/3269 |
| 2019/0238909 A1* | 8/2019 | Graham | H04N 21/23614 |
| 2020/0074181 A1 | 3/2020 | Chang et al. | |
| 2020/0334959 A1* | 10/2020 | Nelson | G07F 17/3211 |
| 2021/0118264 A1* | 4/2021 | Nelson | G07F 17/3223 |
| 2021/0168457 A1* | 6/2021 | Taylor | H04N 21/4788 |
| 2021/0344991 A1* | 11/2021 | Todd | G07F 17/3209 |
| 2022/0157127 A1* | 5/2022 | Tadepalli | H04N 21/458 |

\* cited by examiner

TEMPORARY TELEVISION RIGHTS SCHEME GRANT BASED ON UNCERTAIN MEASURABLE EVENTS

BACKGROUND

Sports wagering has become more popular as it has been legalized in a greater number of jurisdictions. A typical user may place a wager in order to have a greater rooting interest in a particular sporting event. Such a user may wish to place a bet and watch some or all of a broadcast of the sporting event. Embodiments detailed herein facilitate such gambling on and viewing of sporting events.

SUMMARY

Various embodiments are described related to a system for authorizing content viewing. In some embodiments, system for authorizing content viewing is described. The system may comprise a television service provider system. The system may be configured to receive, from an electronic sportsbook provider system, sports wager data corresponding to a sports wager placed by a user. The system may be configured to perform a lookup to determine a content event based on the sports wager data. The system may be configured to, in response to the received sports wager data, authorize a user account using a rights scheme for access to a television channel on which the content event is scheduled to be broadcast. The system may be configured to deauthorize the user account for access to the television channel by removing the rights scheme such that access to the television channel on which the content event was broadcast may be blocked in response to the received sports wager data.

Embodiments of such a system may include one or more of the following features: the television service provider system may be further configured to transmit authorized channel data for the user account to the electronic sportsbook provider system. The system may further comprise the electronic sportsbook provider system configured to set a minimum bet amount partially based on the authorized channel data for the user account. The system may further comprise the electronic sportsbook provider system configured to set odds partially based on the authorized channel data for the user account. The electronic sportsbook provider system may be further configured to receive an indication from the user indicating that viewing access to the content event is desired. The electronic sportsbook provider system may be further configured to map the user account to the user. The sports wager data corresponding to the sports wager may be transmitted by the electronic sportsbook provider system to the television service provider system based at least in part on the indication from the user indicating that viewing access to the content event is desired. The television service provider system may be configured to receive, from the electronic sportsbook provider system, sports wager data corresponding to a plurality of sports wagers placed by the user, the plurality of sports wagers comprising the sports wager. The television service provider system may be configured to cause a mosaic interface to be configured at a content viewing device mapped to the user account that may cause a plurality of content events corresponding to the plurality of sports wagers to be output for presentation concurrently. The content event indicates: the television channel; a date; a start time; and an end time. The system may further comprise a television receiver device. The television service provider system may be further configured to stream the television channel to the television receiver device via a television distribution network. The television receiver device may be mapped to the user account. The television receiver device may be further configured to present an indication of the sports wager placed by the user concurrently with the television channel. The system may further comprise a computerized streaming device. The television service provider system may be further configured to stream the television channel to an application being executed by the computerized streaming device via the Internet. The user account may be active within the application. The television service provider system being configured to deauthorize the user account for access to the television channel by removing the rights scheme may be based on the content event having concluded.

In some embodiments, a method for authorizing content viewing is described. The method may comprise receiving, by a television service provider system from an electronic sportsbook provider system, sports wager data corresponding to a sports wager placed by a user. The method may comprise performing, by the television service provider system, a lookup to determine a content event based on the sports wager data. The method may comprise, in response to the received sports wager data, authorizing, by the television service provider system, a user account using a rights scheme for access to a television channel on which the content event may be scheduled to be broadcast. The method may comprise deauthorizing, by the television service provider system, the user account for access to the television channel by removing the rights scheme such that access to the television channel on which the content event was broadcast may be blocked in response to the received sports wager data.

Embodiments of such a method may include one or more of the following features: the method may further comprise transmitting authorized channel data for the user account to the electronic sportsbook provider system. The method may further comprise setting, by the electronic sportsbook provider system, a minimum bet amount partially based on the authorized channel data for the user account. The method may further comprise setting, by the electronic sportsbook provider system, odds partially based on the authorized channel data for the user account. The method may further comprise receiving, by the electronic sportsbook provider system, an indication from the user indicating that viewing access to the content event is desired. The method may further comprise mapping, by the electronic sportsbook provider system, the user account to the user. The sports wager data corresponding to the sports wager may be transmitted by the electronic sportsbook provider system to the television service provider system based at least in part on the indication from the user indicating that viewing access to the content event is desired. The method may further comprise receiving, by the television service provider system from the electronic sportsbook provider system, sports wager data corresponding to a plurality of sports wagers placed by the user, the plurality of sports wagers comprising the sports wager. The method may further comprise causing, by the television service provider system, a mosaic interface to be configured at a content viewing device mapped to the user account that causes a plurality of content events corresponding to the plurality of sports wagers to be output for presentation concurrently. The content event may indicate: the television channel; a date; a start time; and an end time. The method may further comprise streaming, by the television provider system, the television channel to the television receiver device via a television distribution network. The television receiver device may be mapped to the user account. The method may further comprise outputting for presentation, by the television receiver device, an indication of the sports wager placed by the user concurrently with the television channel.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Embodiments detailed herein are focused on linking outcomes of uncertain measurable events with temporary rights granted to view a broadcast of the event, such as via an entitlement control message (ECM) broadcast via a satellite television distribution system. An event cam be broadcast on a single television channel in a given region, to which access may be separately acquired by a user. Despite the user being interested in viewing a particular event, the user may not have sufficient access rights to decrypt, descramble, or otherwise access the television channel. The user may be disinclined to wager on a particular event if the user will be unable to watch the event in real-time or will require the user to separately interact with a television service provider to obtain access rights.

Embodiments detailed herein are focused on securely linking an external system with a television service provider system to provide temporary content viewing rights. A user can be authorized to view the event corresponding to the uncertain measurable event via the television service provider system. Further, in some embodiments, by the external system being in communication with the television service provider system, parameters of a wager can be adjusted based on whether access to viewing of the uncertain measurable event is to be included as part of the wager. For example, a previously established rights package mapped to a user may be analyzed against possible wagers that can be placed by the user via the electronic sportsbook provider system. If viewing access is to be included as part of the wager, the minimum amount, odds, or other parameters may be adjusted to factor in that rights to access the event are to be granted.

Figure 1:
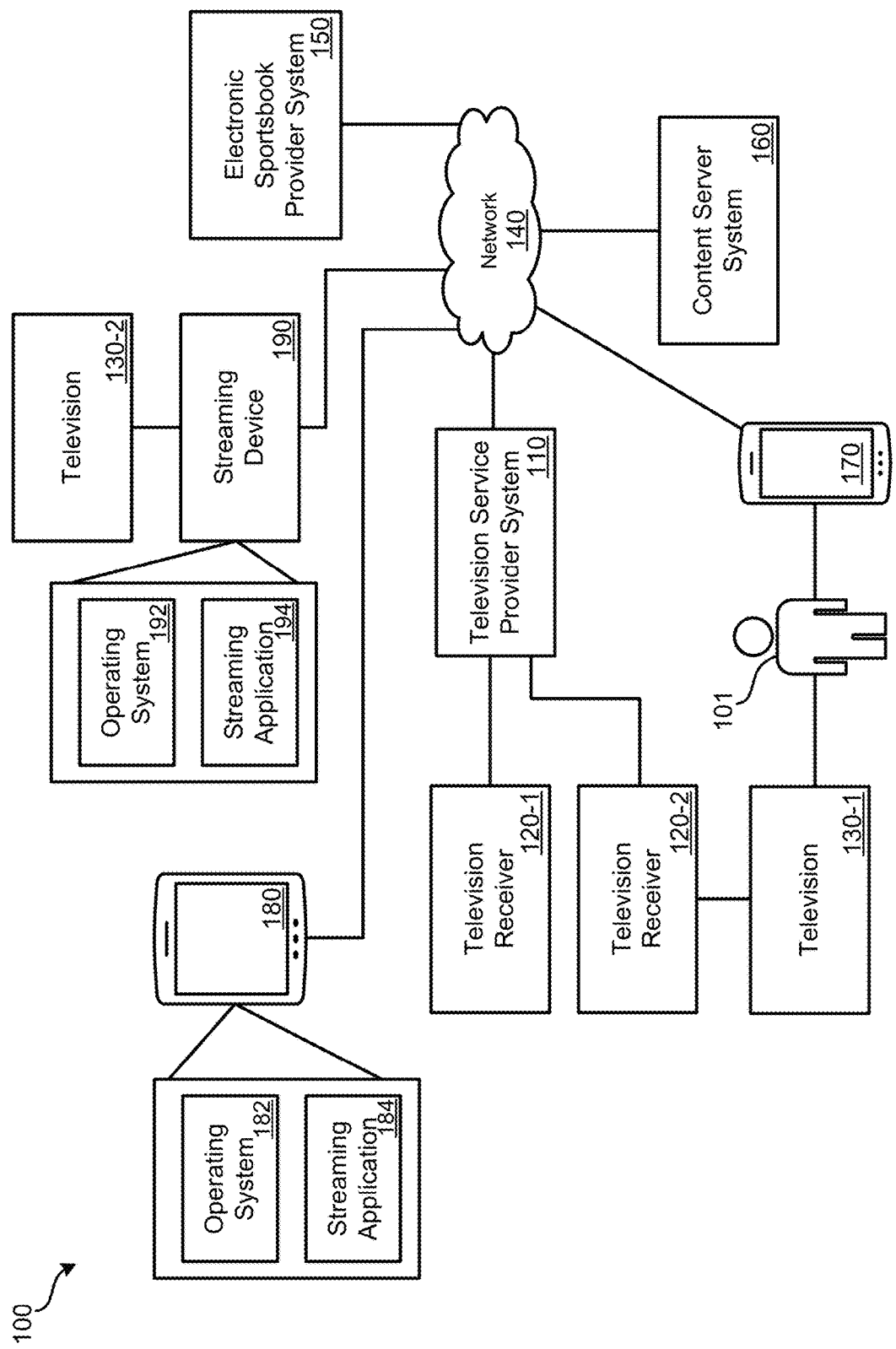
FIG. 1 illustrates an embodiment of a system for authorizing content viewing.

FIG. 1 illustrates an embodiment of a system for authorizing content viewing ("system 100"). System 100 can include: television service provider system 110; television receivers 120 (120-1, 120-2); televisions 130 (130-1, 130-2); network 140; electronic sportsbook provider system 150 ("sportsbook system 150"); content server system 160; mobile device 170; computerized device 180; and streaming device 190. Person 101 can be referred to as a "television viewer" or "user."

Television service provider system 110 may broadcast live television programming to television receivers 120 and/or transmit live television programming as a streaming service via the Internet to computerized devices and streaming devices. "Live" television programming refers to television programming that is transmitted substantially contemporaneously with the event occurring. Live television programming may include a delay of up to several minutes. For instance, a sporting event that is broadcast with a delay of up to a few minutes, such as to edit out offensive audio, would qualify as live television programming. Such live television programming may be received from various content providers, then relayed by television service provider system 110 to television receivers 120 via a television distribution network and/or as an over-the-top (OTT) service to computerized and/or streaming devices via the Internet (or some other public network). Streams of many television channels may be broadcast live via various types of television programming distribution networks, such as a satellite-based network, a cable-based network, an IP-based network, or an OTT television distribution network. In addition to streaming live television channels, television service provider system 110 may transmit on-demand content, applications for execution, electronic programming guide (EPG) data, metadata, and other services ancillary to live television programming. Further detail regarding a possible embodiment of television service provider system 110 is provided in relation to FIG. 2.

While two television receivers 120 are presented, this number of television receivers is merely for illustration—many more television receivers may receive live television programming from television service provider system 110 in other embodiments. A television receiver, such as television receiver 120-2, may be integrated as part of a television or other form of display device or may be a separate device, such as a set top box (STB), that receives data from television service provider system 110 and outputs the data for presentation, such as to television 130-1. The data received by a television receiver may be scrambled or encrypted and the television receiver may only have authorization to decode/descramble particular television channels and/or particular groups of television channels based on a rights scheme assigned to the user account mapped to the television receiver.

Additionally or alternatively, some other form of device that is capable of outputting television programming for presentation may be used instead of television receivers 120. For instance, television programming, such as a live sporting event, may be distributed over network 140 (e.g., including the Internet). Computerized device 180, such as a smartphone, gaming device, or tablet computer may be used to view the television programming. The same computerized device may be used to interact with sportsbook system 150. Computerized device 180 may execute operating system 182. A user may install streaming application 184 on computerized device 180, which permits the user to use a user account to access television service provider system 110 via network 140. The user may be permitted to view any television channel via computerized device 180 for which the user account is presently authorized, such as due to a subscription or other grant of rights.

Streaming device 190 can represent a computerized device that does not directly output video. For instance, streaming device 190 may be plugged into a port of television 130-2, which can be used to output video and/or audio. Similar to computerized device 180, streaming device 190 can execute operating system 192 using one or more processors. Streaming application 194 may be installed on streaming device 190, which can allow television programming streams output by television service provider system 110 to be presented on television 130-2.

Television service provider system 110 may use a dedicated television-distribution network to communicate with television receivers 120. Additionally or alternatively, network 140 may be used to communicate with television receivers 120 and/or sportsbook system 150, and content server system 160. Network 140 may include one or more public and/or private networks, which can include the Internet.

Sportsbook system 150 may be operated by an entity that is distinct from the entity operating television service provider system 110. Sportsbook system 150 may host various wagers and may be used to set the odds on such wagers. A person located in a jurisdiction that permits sports gaming and is of legal age may be permitted to place a wager via sportsbook system 150. A person may be able to access sportsbook system 150 using a computerized device, such as mobile device 170. Mobile device 170 may allow television viewer 101 to access sportsbook system 150 via an application installed on mobile device 170 or by using a web browser on mobile device 170 to access the website of sportsbook system 150. Mobile device 170 may be a smart phone, gaming device, tablet computer, laptop computer, cellular phone, desktop computer, personal digital assistant, or some other form of computerized device.

Television service provider system 110 may communicate with sportsbook system 150 via network 140. Sportsbook system 150 may provide an indication of various wagers and the associated odds with such wagers to television service provider system 110. Television service provider system 110 may relay such betting information to television receivers 120. Sportsbook system 150 may also transmit indications of wagers placed by particular television viewers to television service provider system 110. Television service provider system 110 may relay wagers placed by a particular television viewer to the television viewer's television receiver for presentation. Sportsbook system 150 may query television service provider system 110 to determine whether a user has access to a particular television channel or for a listing of all television channels to which the user has access. Alternatively, an indication of a wager may be sent to television service provider system 110 by sportsbook system 150. Television service provider system 110 may determine a content event associated with the wager and determine whether a user has access. An indication of whether the user has access to the content event on a television channel may be provided back to sportsbook system 150.

Content server system 160 may provide information ancillary to television service provider system 110 and sportsbook system 150. For example, content server system 160 may provide details on the sporting event, such as the television channel, the date, the scheduled start time and scheduled end time of the sporting event on the television channel, details of the teams and players participating in the sporting event (e.g., team records, player-specific statistics), the location of the sporting event, and/or other details of the sporting event.

Television viewer 101 may be using television 130 to view the sporting event. The sporting event may be received as live television programming by television receiver 120-2 from television service provider system 110. Television viewer 101 may use a remote control to interact with television receiver 120-2. Television viewer 101 has an option to view a sports gaming interface. In some embodiments, some other form of electronic device may be used, such as a computerized mobile device or smartphone. This sports gaming interface can be output concurrently with television programming, such as the live sporting event being viewed by television viewer 101. The sports gaming interface may function as an application that is installed on television receiver 120-2. Television service provider system 110 may have previously transmitted data to all of television receivers 120 or in response to a request for a particular television receiver initiated by a user, such as television viewer 101. A similar interface may be presented via streaming applications 184 and 194.

Television viewer 101 may also be using mobile device 170. Television viewer 101 may, via the sports gaming interface output by television receiver 120-2, trigger one or more staged wagers to be transmitted to mobile device 170. In such embodiments, the sports gaming interface executed by television receiver 120-2 may transmit a pre-staged wager, which can include an indication of the one or more wagers (a wage identifier) and an account identifier to television service provider system 110. Television service provider system 110 relays this information to sportsbook system 150 via network 140. Alternatively, the sports gaming interface may use an application programming interface (API) to relay an indication of the one or more wagers to the sportsbook system 150 (without communicating through television service provider system 110). Sportsbook system 150 may then be triggered to transmit a link or notification to mobile device 170. In some embodiments, a pop-up notification is presented on mobile device 170, that can be selected by television viewer 101. Selection of such notification may cause a website or application executed by mobile device 170 to launch that will include the pre-staged wagers set up by television viewer 101 via the sports gaming interface output by television receiver 120-2. In other embodiments, a link may be sent, such as via text message or email, to mobile device 170. Again here, watching the link may cause a website or application executed by mobile device 170 to launch that will include the pre-staged wagers set up by television viewer 101 of the sports gaming interface output by television receiver 120-2. Television viewer 101 may then edit, fund, and/or otherwise complete the pre-staged wagers set up via the sports gaming interface. Similarly, television viewer 101 may interact with mobile device 170 to complete a bet similarly when viewing television channels via computerized device 180 and/or streaming device 190.

In some embodiments, television receiver 120-2 can communicate with mobile device 170. After television viewer 101 has pre-staged one or more wagers using the sports gaming interface output by television receiver 120-2, television viewer 101 can trigger presentation of a machine-readable code, such as a barcode or QR (Quick Response) code, to be output by television receiver 120-2 and presented via television 130. The machine-readable code may be read by mobile device 170 using an application for reading machine-readable codes or functionality integrated into a sports gaming application associated with sportsbook system 150. The machine-readable code may have identifiers of the staged wagers embedded. These identifiers may be used by sportsbook system 150 to cause mobile device 170 to present the staged wagers and allow television viewer 101 to edit, fund, and/or otherwise complete the pre-staged wagers.

Alternatively, an indication of such bets and an associated identifier may be transmitted by television receiver 120-2 to television service provider system 110, which may relay the information to sportsbook system 150. The associated identifier may be embedded in the machine-readable code and may be acquired by mobile device 170 by imaging the machine-readable code. The associated identifier may then be transmitted by mobile device 170 to sportsbook system 150 to retrieve the staged wagers that are mapped to the identifier.

Figure 2:
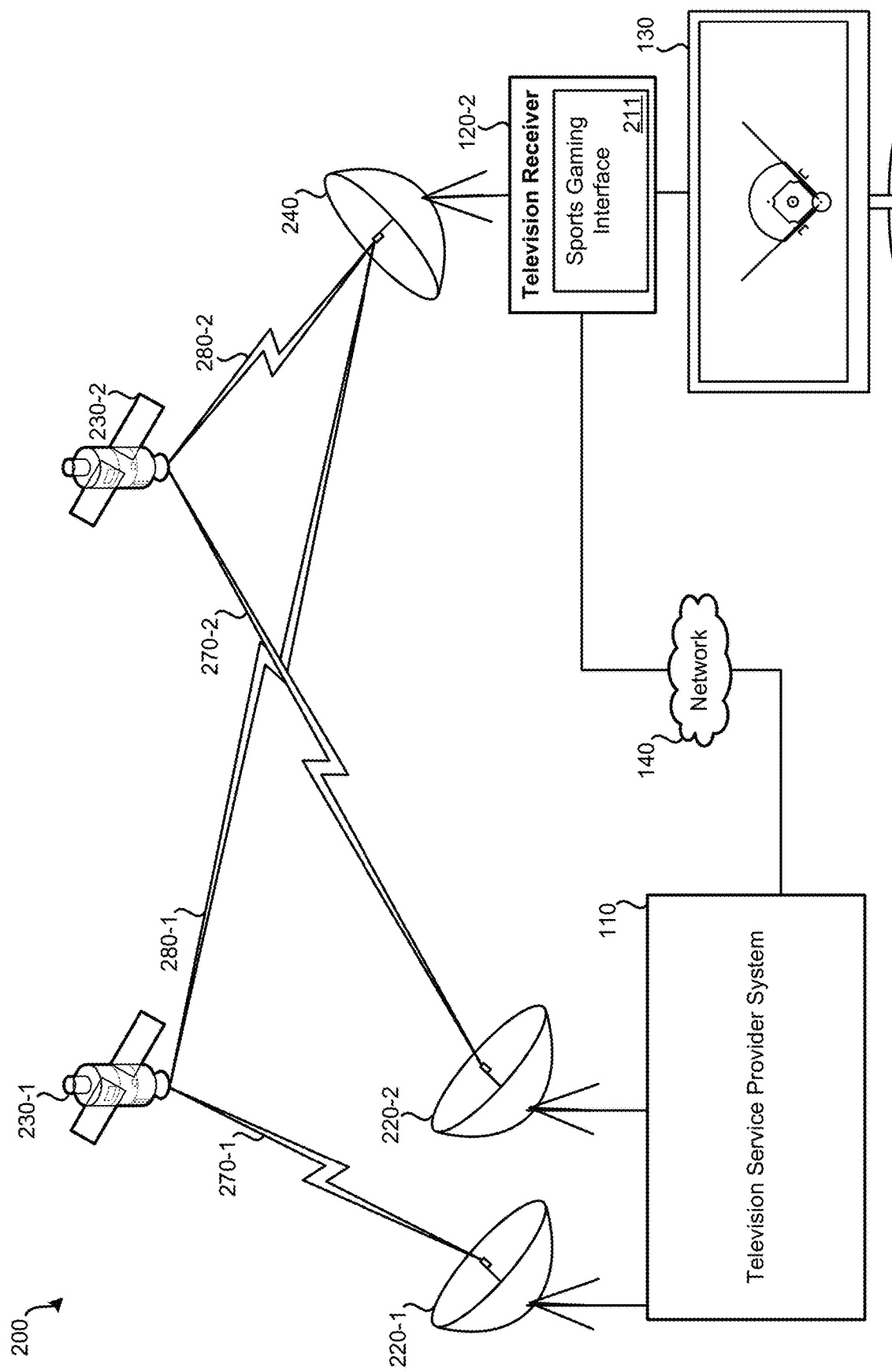
FIG. 2 illustrates an embodiment of a television distribution system.

FIG. 2 illustrates an embodiment of a satellite-based television distribution system 200. Satellite-based television distribution system 200 may include: television service provider system 110, satellite transmitter equipment 220, satellites 230, satellite antenna 240, television receiver 120-2, and television 130. Alternate embodiments of satellite-based television distribution system 200 may include fewer or greater numbers of components. While only one satellite antenna 240, television receiver 120-2, and television 130 (which can collectively be referred to as "user equipment") are illustrated, it should be understood that multiple (e.g., tens, thousands, millions) instances of user equipment may receive television signals from television service provider system 110 via satellites 230. In the example of FIG. 2, while television service provider system 110 uses satellites to communicate with television receiver 120-2, other forms of television programming distribution networks can be used in other embodiments.

Television service provider system 110 and satellite transmitter equipment 220 may be operated by a television service provider. A television service provider may distribute television channels that distribute live television programming, on-demand programming, pay-per-view (PPV) programming, programming information, data, firmware updates, and/or other content/services to users. Television service provider system 110 may receive feeds of one or more live television channels from various sources. Such television channels may include multiple television channels that contain at least some of the same content (e.g., network affiliates). To distribute television channels for presentation to users, feeds of the television channels may be relayed to user equipment via multiple television distribution satellites. Each satellite may relay multiple transponder streams. Satellite transmitter equipment 220 (120-1, 220-2) may be used to transmit a feed of one or more television channels from television service provider system 110 to one or more satellites 230. While a single television service provider system 110 and satellite transmitter equipment 220 are illustrated as part of satellite-based television distribution system 200, it should be understood that multiple instances of transmitter equipment may be used, possibly scattered geographically, to communicate with satellites 230. Such multiple instances of satellite transmitting equipment may communicate with the same or with different satellites. Different television channels may be transmitted to satellites 230 from different instances of transmitting equipment. For instance, a different satellite antenna of satellite transmitter equipment 220 may be used for communication with satellites in different orbital slots.

Satellites 230 may be configured to receive signals, such as streams of television channels, from one or more satellite uplinks such as satellite transmitter equipment 220. Satellites 230 may relay received signals from satellite transmitter equipment 220 (and/or other satellite transmitter equipment) to multiple instances of user equipment via transponder streams. Different frequencies may be used for uplink signals 270 from transponder streams 280. Satellites 230 may be in geosynchronous orbit. Each of the transponder streams transmitted by satellites 230 may contain multiple television channels transmitted as packetized data. For example, a single transponder stream may be a serial digital packet stream containing multiple television channels. Therefore, packets for multiple television channels may be interspersed.

Multiple satellites 230 may be used to relay television channels from television service provider system 110 to satellite antenna 240. Different television channels may be carried using different satellites. Different television channels may also be carried using different transponders of the same satellite; thus, such television channels may be transmitted at different frequencies and/or different frequency ranges. As an example, a first and second television channel may be relayed via a first transponder of satellite 230-1. A third, fourth, and fifth television channel may be relayed via a different satellite or a different transponder of the same satellite relaying a transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment. Each transponder stream may be able to carry a finite amount of data. As such, the number of television channels that can be included in a particular transponder stream may be at least partially dependent on the resolution of the video of the television channel. For example, a transponder stream may be able to carry seven or eight television channels at a high resolution, but may be able to carry dozens, fifty, a hundred, two hundred, or some other number of television channels at reduced resolutions.

Satellite antenna 240 may be a piece of user equipment that is used to receive transponder streams from one or more satellites, such as satellites 230. Satellite antenna 240 may be provided to a subscriber for use on a subscription basis to receive television channels provided by the television service provider system 110, satellite transmitter equipment 220, and/or satellites 230. Satellite antenna 240, which may include one or more low noise blocks (LNBs), may be configured to receive transponder streams from multiple satellites and/or multiple transponders of the same satellite. Satellite antenna 240 may be configured to receive television channels via transponder streams on multiple frequencies. Based on the characteristics of television receiver 120-2 and/or satellite antenna 240, it may only be possible to capture transponder streams from a limited number of transponders concurrently. For example, a tuner of television receiver 120-2 may only be able to tune to a single transponder stream from a transponder of a single satellite at a given time. The tuner can then be re-tuned to another transponder of the same or a different satellite. A television receiver 120-2 having multiple tuners may allow for multiple transponder streams to be received at the same time.

In communication with satellite antenna 240 may be one or more television receivers. Television receivers may be configured to decode signals received from satellites 230 via satellite antenna 240 for output and presentation via a display device, such as television 130. A television receiver may be incorporated as part of a television or may be part of a separate device, commonly referred to as a set-top box (STB). Television receiver 120-2 may decode signals received via satellite antenna 240 and provide an output to television 130. FIG. 2 provides additional detail of various embodiments of a television receiver. A television receiver is defined to include set-top boxes (STBs) and also circuitry having similar functionality that may be incorporated with another device. For instance, circuitry similar to that of a television receiver may be incorporated as part of a television. As such, while FIG. 2 illustrates an embodiment of television receiver 120-2 as separate from television 130, it should be understood that, in other embodiments, similar functions may be performed by a television receiver integrated with television 130.

Television 130 may be used to present video and/or audio decoded and output by television receiver 120-2. Television receiver 120-2 may also output a display of one or more interfaces to television 130, such as an electronic programming guide (EPG). In many embodiments, television 130 is a television. Television 130 may also be a monitor, computer, or some other device configured to display video and, possibly, play audio.

Uplink signal 270-1 represents a signal between satellite transmitter equipment 220 and satellite 230-1. Uplink signal 270-2 represents a signal between satellite transmitter equipment 220 and satellite 230-2. Each of uplink signals 270 may contain streams of one or more different television channels. For example, uplink signal 270-1 may contain a first group of television channels, while uplink signal 270-2 contains a second group of television channels. Each of these television channels may be scrambled such that unauthorized persons are prevented from accessing the television channels.

Transponder stream 280-1 represents a transponder stream signal between satellite 230-1 and satellite antenna 240. Transponder stream 280-2 represents a transponder stream signal between satellite 230-2 and satellite antenna 240. Each of transponder streams 280 may contain one or more different television channels, which may be at least partially scrambled. For example, transponder stream 280-1 may be a first transponder stream containing a first group of television channels, while transponder stream 280-2 may be a second transponder stream containing a different group of television channels. When a television channel is received as part of a transponder stream and is decoded and output to television 130 (rather than first storing the television channel to a storage medium as part of DVR functionality, then later outputting the television channel from the storage medium), the television channel may be considered to be viewed "live."

FIG. 2 illustrates transponder stream 280-1 and transponder stream 280-2 being received by satellite antenna 240 and distributed to television receiver 120-2. For a first group of television channels, satellite antenna 240 may receive transponder stream 280-1 and for a second group of channels, transponder stream 280-2 may be received. Television receiver 120-2 may decode the received transponder streams. As such, depending on which television channels are desired to be presented or stored, various transponder streams from various satellites may be received, descrambled, and decoded by television receiver 120-2.

Network 140 may serve as a secondary communication channel between television service provider system 110 and television receiver 120-2. However, in many instances, television receiver 120-2 may be disconnected from network 140 (for reasons such as because television receiver 120-2 is not configured to connect to network 140 or a subscriber does not desire or cannot connect to network 140). Via such a secondary communication channel, bidirectional exchange of data may occur. As such, data may be transmitted to television service provider system 110 from television receiver 120-2 via network 140. Data may also be transmitted from television service provider system 110 to television receiver 120-2 via network 140. Network 140 may be the Internet. While audio and video services may be provided to television receiver 120-2 via satellites 230, feedback from television receiver 120-2 to television service provider system 110 may be transmitted via network 140. In some embodiments, sports gaming data to populate the sports gaming application may be sent via satellites 230 such that a television viewer can use the sports gaming application even if no internet application is available to television receiver 120-2.

Television service provider system 110, which can include one or more computer server systems, can execute sports gaming interface 211. Sports gaming interface 211 may serve as an intermediary between television receivers and sportsbook system 150. Sports gaming interface 211 may forward information from sportsbook system 150 to the appropriate television receiver. Sports gaming interface 211 may forward information from a television receiver, such as television receiver 120-2, to sportsbook system 150. Sports gaming interface 211 may maintain a datastore that indicates an account identifier or television receiver identifier that is mapped to a sports gaming account identifier. Therefore, if sports gaming interface 211 receives data mapped to a particular sports gaming account identifier, television service provider system 110 can forward the information, either via network 140 or via satellite, to the appropriate television receiver.

Figure 3:
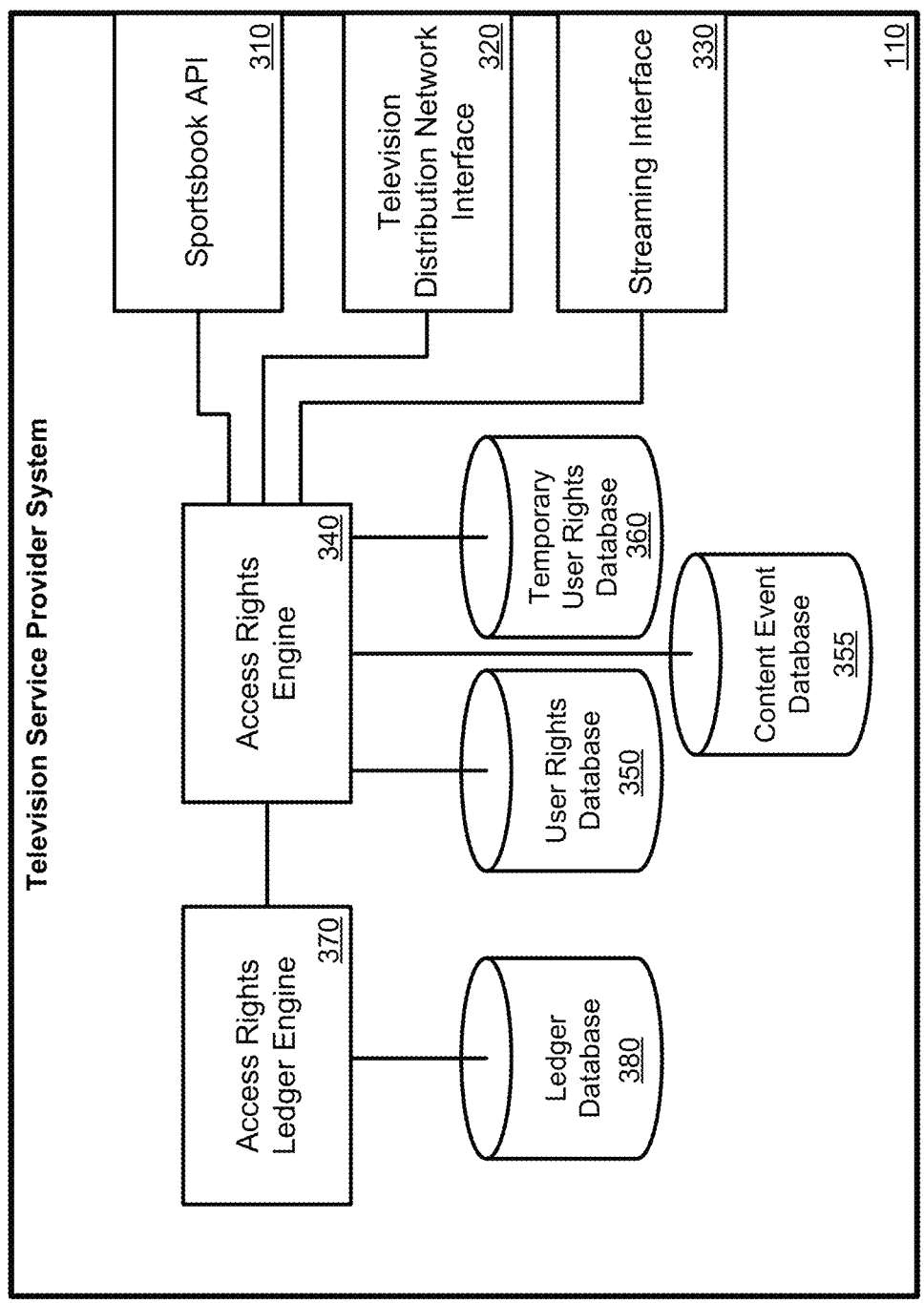
FIG. 3 illustrates an embodiment of a television service provider system.

FIG. 3 illustrates an embodiment of television service provider system 110. Television service provider system 110 can include: sportsbook application programming interface (API) 310; television distribution network interface 320; streaming interface 330; access rights engine 340; user rights database 350; content event database 355; temporary user rights database 360; access rights ledger engine 370; and ledger database 380.

Television service provider system 110 may include one or more special-purpose or general-purpose processors to perform the functions of its various components. Such special-purpose processors may include processors that are specifically designed to perform the functions detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD).

Sportsbook API 310 may be used to communicate with sportsbook system 150. Sportsbook API 310 may receive queries from sportsbook system 150 related to: whether a particular user account has access to a particular television channel; a request for a listing for television channels to which a user account does (or does not) have access; an indication of a specific wager and user account to determine if the user account is permitted to view the associated sporting event; and a request for access for a particular user account for a content event.

In response to a query received via sportsbook API 310, access rights engine 340 may query user rights database 350 to determine one or more rights schemes mapped to a user account. User rights database 350 may indicate television channels to which a user account has access based on a subscription with the television service provider. Access rights engine 340 can be used to determine if a user account has access to a particular television channel or to retrieve a listing of all television channels (or all channels within a particular genre, e.g., sports) to which the user account has access. An indication of whether access is permitted to a particular television channel or a listing of channels to which access is permitted may be returned via sportsbook API 310 to sportsbook system 150.

In some embodiments, access rights engine 340 may receive an indication of a wager or event from sportsbook API 310. Access rights engine 340 may access content event database 355 or content server system 160 to obtain details about the television channel associated with the wager or event. For example, content server system 160 or content event database 355 may provide details on the sporting event, such as the television channel, the date, the scheduled start time and scheduled end time of the sporting event on the television channel, details of the teams and players participating in the sporting event (e.g., team records, player-specific statistics), the location of the sporting event, and/or other details of the sporting event.

In response to a request from sportsbook API 310, access rights engine 340 can grant temporary access to the user account to view a particular television channel, which may be a PPV channel or a television channel associated with a content provider (e.g., ESPN, Fox Sports, TNT, etc.). Access rights engine 340 may create an entry in temporary user rights database 360 that indicates a particular rights scheme to which the user account is being granted temporary access based on a wager placed with sportsbook API 310. In some embodiments, rather than using a separate temporary user rights database 260, user rights within user rights database 350 may be modified. A particular rights scheme may give a user account access to a particular television channel or a set of television channels. For example, a set of television channels may be linked with the same rights scheme and, therefore, access may only be able to be controlled as a group. If a user is to be granted access rights to a particular television channel, a particular rights scheme may give the user temporary access to a group of television channels that includes the television channel on which the sporting event is being broadcast. If the user uses an OTT streaming platform rather than a dedicated television receiver to view the event, the user may have access only to the particular television channel since access rights may be handled differently for different forms of content delivery networks.

Included in an entry in temporary user rights database 360 may be an indication of when access should be revoked for the television channel on which the sporting event is being broadcast. In some embodiments, access is provided only for the time period (plus a buffer amount of time) for which the sporting event is scheduled. In other embodiments, access may be granted on a day by day basis. Therefore, if a user account is to receive a rights scheme to view a particular television channel, the user account may be authorized to view the particular television channel for the entire day on which the sporting event is scheduled.

When a television channel has been authorized for viewing, access rights engine 340 may cause data to be transmitted via television distribution network interface 320 via the television distribution network that causes the television receiver to be authorized to be the television channel. For example, in the example of a satellite-based television distribution network, an encrypted addressed message to the set-top box associated with the user account may be sent that provides sufficient information to allow the STB to decrypt or descramble the television channel. A permission message may also be sent via streaming interface 330 to a streaming platform that provides access rights to the user account to view the television channel via an OTT streaming network.

Access rights ledger engine 370 may monitor instances of access to a television channel being granted based on a message received from via sportsbook API 310 from sportsbook system 150. Access rights ledger engine 370 may make a record within ledger database 380 that indicates the period of time for which each user account was granted access, and to which television channel access was granted. Ledger database 380 may be used to properly compensate content providers that produced the television channels. This information may also be used to obtain compensation from the sportsbook provider for access being granted to the television channel.

After a sporting event associated with a wager has concluded, access to the television channel by the user account may be revoked. Access rights engine 340 may access temporary user rights database 360 to determine content events that have already occurred and, thus, access to the associated television channel should be revoked. Temporary user rights database 360 can include a date/time entry in a database entry indicating when the rights scheme for a television channel for a user account should be removed. Upon the time being reached, access rights engine 340 can communicate with television distribution network interface 320 and streaming interface 330 to deauthorize access to the television channel by the user account. In some embodiments, the amount of time granted for access to the television channel is extended significantly before and/or after the content event to encourage the user to place the wager.

Figure 4:
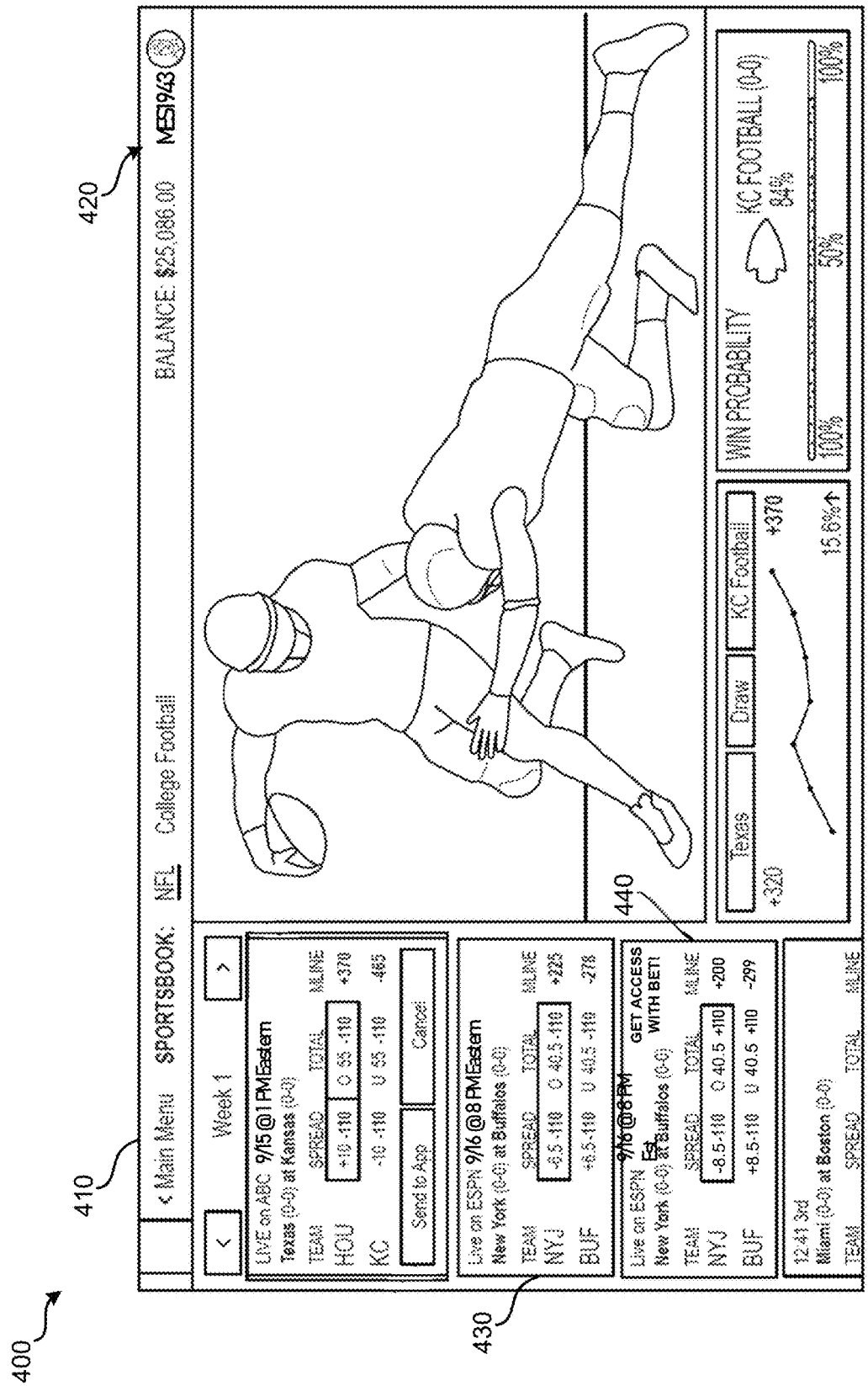
FIG. 4 illustrates an embodiment of a sports wagering user interface.

FIG. 4 illustrates an embodiment 400 of a sports wagering user interface 410 ("interface 400"). Interface 400 may be presented by a streaming device (via a television), a television receiver (via a television), and/or via a computerized device. Sports wagering user interface 410 may allow a user to review, stage, or book wagers with a sportsbook system. In some embodiments, content may be viewed live while prospective and booked wagers are viewed. Sports wagering user interface 410 (which may not include live content) may also be provided directly by sportsbook system 150, such as on an application executed on a mobile device. Interface 410 may allow a user to provide credentials, such as a username and password, and may also allow the user to access a user account with the sportsbook system 150.

Sports event wager block 430 corresponds to the same sporting event as sports event wager block 440. When a wager is placed through sports event wager block 440, access to view the sporting event is provided through the television service provider system, whereas in the case of the wagers placed through sports event wager block 430, access is not included as part of the wager. The odds, payout, minimum bet, or other parameters of the wager may be set based on whether access to view the sporting event is to be included with the wager. Therefore, exclusively considering gambling, a wager that does not include viewing rights may remain the best deal for the user. However, when enjoyment is factored in, the user may prefer selection of a wager that includes viewing rights.

In other embodiments, viewing access may always be included with the wager and parameters of the wager may not be adjusted to factor in providing access. In some embodiments, user accounts with the sportsbook system that are within at least a certain tier of customers (e.g., customers who bet at least $100 per month) may be provided access to the content without any change in parameters of the wager. In still other embodiments, a user may be permitted to specify whether he desires access to view any or particular sporting events prior to available wagers being presented to the user. Whether wagers include viewing access may be at least partially dependent on the answers of the user. In some embodiments, as part of a points or rewards system, a user may receive points for placing wagers, which can be redeemed for viewing the sports event linked with a wager. In some embodiments, by placing certain types or amounts of wagers, a user may receive unrestricted sports event viewing on certain television channels.

To produce interface 410, a query may first have been performed to determine that the user account does not have access to the television channel on which the sporting event of sports event wager blocks 430 and 440 are to be broadcast. In contrast, if it had been determined that the user account already has a subscription or other form of access to the television channel on which the sporting event of sports event wager blocks 430 and 440 is to be broadcast, interface 410 could only include a single sports event wager block that does not refer to viewing access.

In some embodiments, a user may place more than one wagers that results in the user wanting to watch multiple television channels simultaneously. To view such television channels simultaneously, a user may be set content output device, such as a television receiver, to a particular television channel number or mode. The television receiver may obtain content from the multiple television channels associated with wagers for which a corresponding event is currently occurring and present the multiple television channels simultaneously in the form of a mosaic. The number of television channels can be varied based on the currently-active wagers of the user. A user may be permitted to select a particular television channel from the mosaic if the user desires to listen to audio from that television channel. The user may also be permitted to select a particular television channel to view full screen.

Figure 5:
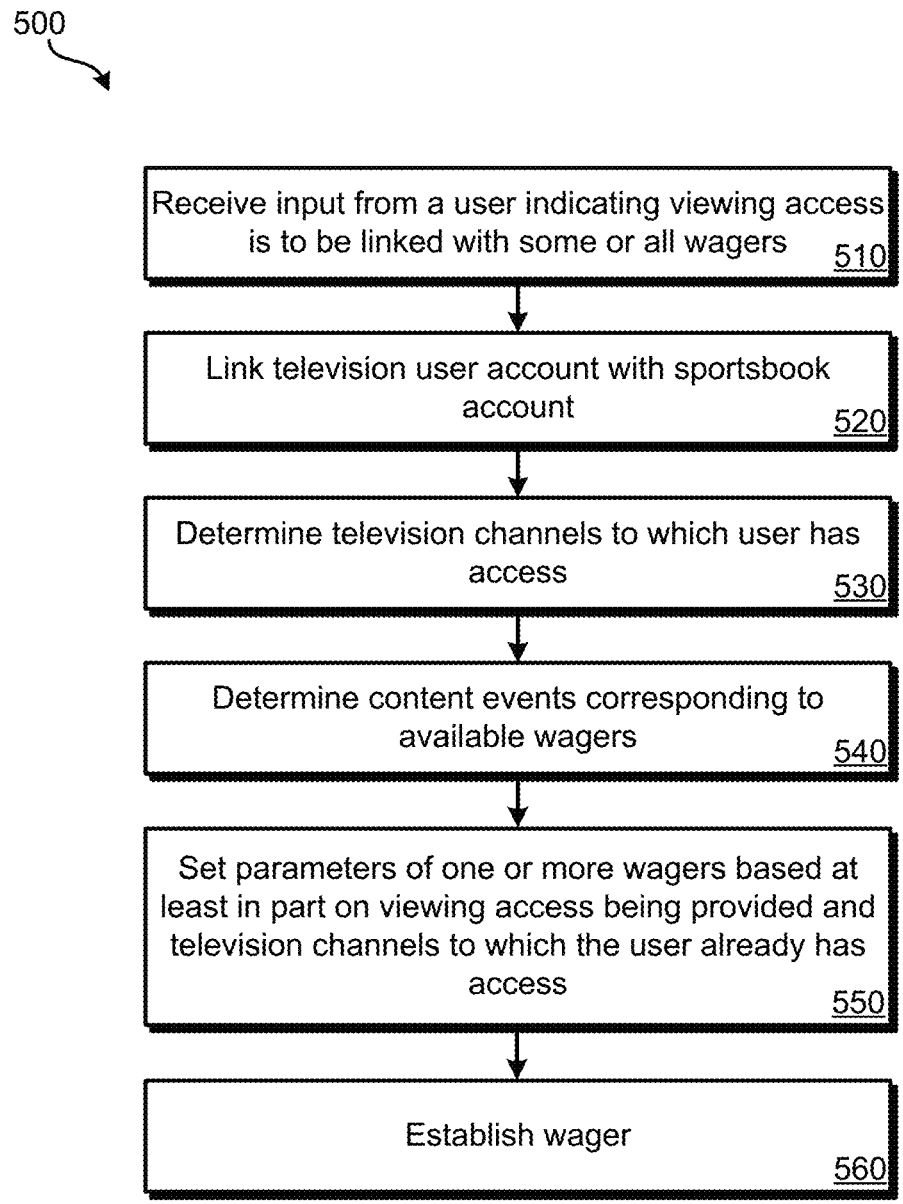
FIG. 5 illustrates an embodiment of a method for authorizing content viewing.

Various methods may be performed using the systems and interfaces detailed in relation to FIGS. 1-4. FIG. 5 illustrates an embodiment of a method 500 for authorizing content viewing. Method 500 may be performed using system 100, including television service provider system 110 of FIG. 3 and sportsbook system 150.

At block 510, via a television receiver, streaming device, computerized device, or mobile device, a user can submit input to the sportsbook system indicating whether viewing access is to be included in any, some, all, or particular wagers. Such input from the user can be received by the sportsbook system in association with an indication of a user account of the user. In some embodiments, a user may select particular television channels for which he desires to obtain access when a wager is placed. In other embodiments, the user may only provide an indication of whether or not access to view content associated with a sports wager is desired. The user may be permitted to indicate that he desires both options that include viewing and options that do not include viewing to be offered.

At block 520, which may be performed in response to block 510, the sportsbook user account may be linked with a television service provider user account of the user. Block 520 permits the sportsbook system to provide a request to the television service provider system for access for viewing a particular television channel or piece of content for the correct user account at the television service provider system. Block 520 can involve the user providing a username and password for the television service provider system to the sportsbook system. Alternatively, block 520 can involve the user providing a username and password for the sportsbook system to the television service provider system. Block 520 may be performed by the television service provider system and/or the sportsbook system.

At block 530, a determination may be made by the television provider system as to which television channels the television service provider user account of the user has access. Block 530 may be performed in response to a request from the sportsbook system. The sportsbook system may send a request to determine whether access is available to a particular television channel or to retrieve a list of all television channels to which the user account has access. The television service provider system may access a user rights database to determine one or more rights schemes assigned to the user account. In response to the request, an indication of whether the user account has access to the particular television channel or a list of television channels may be provided.

At block 540, the sportsbook system may determine content events corresponding to wagers available for selection by the user. To determine a content event, the sportsbook system may retrieve event information from a database or a separate provider system, such as content server system 160. The content event may indicate the television channel, date, start time, and end time of the sporting event. This information may be used to determine whether or not the user has access through the television service provider system to the television channel on which the content event is scheduled to be broadcast. In some embodiments, a user interface output by the sportsbook system may indicate details of the content event. In some embodiments, a further determination may be made by the sportsbook system as to whether the television channel is available for access to be temporarily granted based on a sports wager. (For example, the television service provider may block access to particular television channels.)

At block 550, one or more parameters of the wager may be set by the sportsbook system based at least in part on a determination based on block 510 that access to a content event associated with the wager is desired, the content event associated with the wager being at block 540, and the user does not already have access to the television channel based on block 530. The perimeter of the wager that is set at block 550 may be a minimum wager amount, the odds, the spread, or some other parameter of the wager. In other embodiments, rather than a perimeter of the wager being adjusted, access to view the content event may be offered on some other basis, such as by redeeming points, by a promotion, or by the user having qualified for particular rewards level with the sportsbook provider.

At block 560, the user may enter into the wager with the sportsbook system. This can include the user selecting an amount of money that he desires to place on the wager and the amount of money being deducted from an account of the user established with the sportsbook system. The user may be issued an electronic wager receipt indicative of a unique identifier mapped to the wager. Block 560 being completed may trigger access for viewing the content event mapped to the wager being provided. Access to viewing the content event may be provided as detailed in relation to method 600 of FIG. 6.

Figure 6:
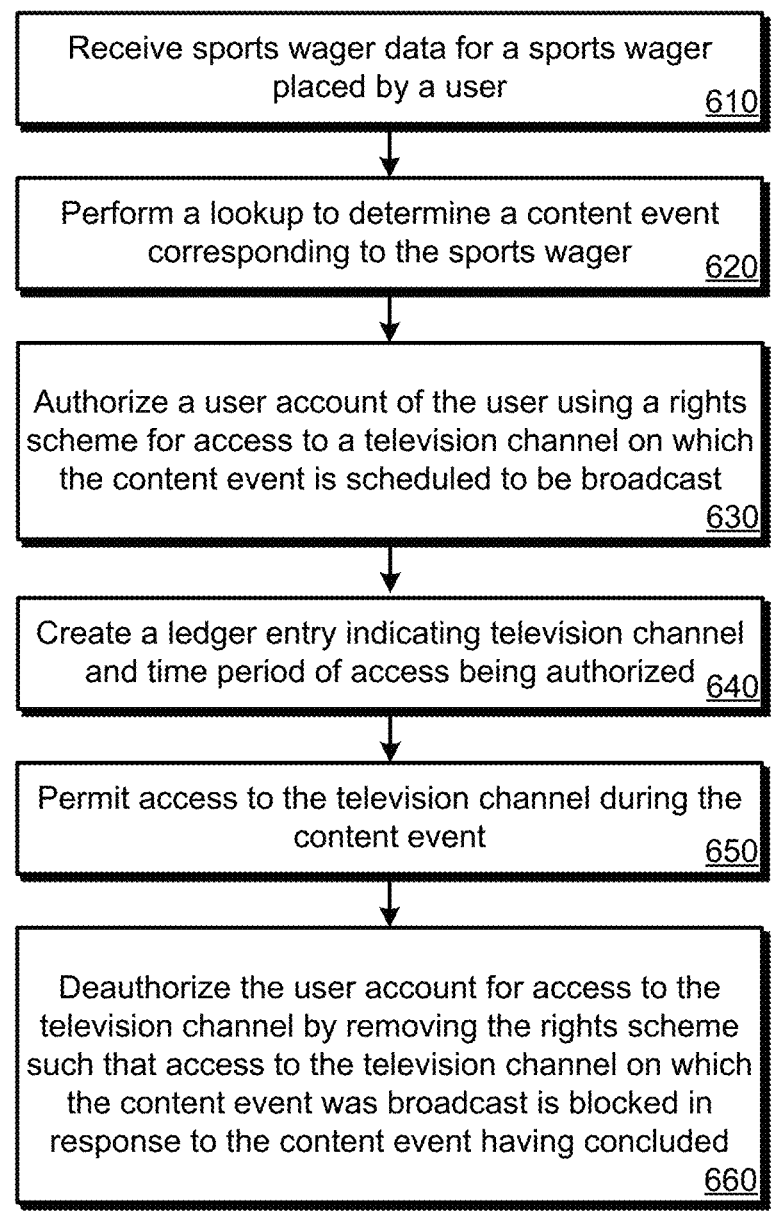
FIG. 6 illustrates another embodiment of a method for authorizing content viewing.

FIG. 6 illustrates an embodiment of a method for authorizing content viewing. Method 600 may be performed using system 100, including television service provider system 110 of FIG. 3 and sportsbook system 150. Method 600 may be performed following method 500.

At block 610, sports wager data for a sports wager placed by a user may be received by a television service provider system. The sports wager data may indicate: one or more teams on which the sports wager was placed, the date of the event corresponding to the sports wager, a television channel corresponding to the sports wager, a start time and, possibly, a time of the sports event corresponding to the sports wager, wager parameters, and/or the amount placed on the wager by the user. In some embodiments, the sports wager data may indicate the date, start time, end time, and television channel for which access should be authorized and, therefore, block 620 may not need to be performed.

At block 620, if further information about the sports wager is needed by the television service provider, the television service provider may perform a content event look-up based on the sports wager data. The content event lookup may be used to determine the television channel, date, start time, and, possibly, end time of the sporting event corresponding to the wager.

At block 630, the user account of the user at the television service provider may be authorized using a rights scheme that provides access to the television channel on which the content event is scheduled to be broadcast. The rights scheme may be activated a predetermined amount of time prior to the beginning of the content event. In some embodiments, this may mean that the rights scheme is authorized for the entire day on which the content event is scheduled to be broadcast. In other embodiments, the rights scheme may be authorized for an hour before and two hours after the content event to ensure the entirety of the content event is accessible by the user. The rights scheme that is authorized may permit the user to view more television channels than the television channel on which the content event is to be broadcast; alternatively, the rights scheme may be limited to only the television channel on which the content event is scheduled to be broadcast. Block 630 may include an entry being made by the television service provider system in a temporary rights database or other form of rights database such that the user account can be used to view the television channel on which the content event is scheduled to be broadcast. For satellite-based television receivers, this can include an addressed permission message being transmitted via satellite that is received by the television receiver mapped to the user account.

At block 640, the television service provider system may create a ledger entry indicating the television channel or rights package and the time period of access that has been authorized based on the sports wager data received at block 610.

At block 650, access to the television channel may be permitted during the authorized time period. At block 660, following an end time of the content event or the next day following the content event, the user account maintained by the television service provider system may be de-authorized for access by the television service provider system, such as by removing the rights scheme from a temporary access database.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A system for authorizing content viewing, the system comprising:
   an electronic sportsbook provider system, configured to:
      provide wager information to a television service provider system; and
      host wagers on sporting events; and
   the television service provider system, in communication with the electronic sportsbook provider system, configured to:
      receive, from the electronic sportsbook provider system, sports wager data indicating that a sports wager has been placed by a user via the electronic sportsbook provider system;
      perform a lookup to determine a content event based on the sports wager data, wherein the content event defines a television channel, a date, and a scheduled start time;
      in response to the received sports wager data, authorize a user account mapped to the user for viewing the television channel for the content event based on the date and the scheduled start time;
      create an entry in a database indicating the television channel and a time period of access authorized for the user account;
      permit access to the television channel during the content event; and after the content event ends, deauthorize the user account mapped to the user for viewing the television channel such that access to the television channel on which the content event was broadcast is blocked.

2. The system for authorizing content viewing of claim 1, wherein the television service provider system is further configured to transmit authorized channel data for the user account to the electronic sportsbook provider system.

3. The system for authorizing content viewing of claim 2, further comprising the electronic sportsbook provider system configured to set a minimum bet amount partially based on the authorized channel data for the user account.

4. The system for authorizing content viewing of claim 2, further comprising the electronic sportsbook provider system configured to set odds partially based on the authorized channel data for the user account.

5. The system for authorizing content viewing of claim 1, further comprising the electronic sportsbook provider system configured to:
  receive an indication from the user indicating that viewing access to the content event is desired; and
  map the user account to the user, wherein the sports wager data corresponding to the sports wager is transmitted by the electronic sportsbook provider system to the television service provider system based at least in part on the indication from the user indicating that viewing access to the content event is desired.

6. The system for authorizing content viewing of claim 1, further comprising the television service provider system configured to:
  receive, from the electronic sportsbook provider system, sports wager data corresponding to a plurality of sports wagers placed by the user, the plurality of sports wagers comprising the sports wager; and
  cause a mosaic interface to be configured at a content viewing device mapped to the user account that causes a plurality of content events corresponding to the plurality of sports wagers to be output for presentation concurrently.

7. The system for authorizing content viewing of claim 1, wherein the content event indicates: an end time.

8. The system for authorizing content viewing of claim 1, further comprising:
  a television receiver device, wherein the television service provider system is further configured to:
    stream the television channel to the television receiver device via a television distribution network, wherein the television receiver device is mapped to the user account.

9. The system for authorizing content viewing of claim 8, wherein
  the television receiver device is further configured to present an indication of the sports wager placed by the user concurrently with the television channel.

10. The system for authorizing content viewing of claim 1, further comprising:
  a computerized streaming device, wherein the television service provider system is further configured to:
    stream the television channel to an application being executed by the computerized streaming device via the Internet, wherein the user account is active within the application.

11. The system for authorizing content viewing of claim 1, wherein the television service provider system being configured to deauthorize the user account for access to the television channel is based on the content event having concluded.

12. A method for authorizing content viewing, the method comprising:
  receiving, by an electronic sportsbook provider system, a wager from a user;
  providing, by the electronic sportsbook provider system to a television service provider system, sports wager data indicating that the sports wager has been placed by the user on the electronics sportsbook provider system;
  receiving, by the television service provider system from the electronic sportsbook provider system, the sports wager data;
  performing, by the television service provider system, a lookup to determine a content event based on the sports wager data, wherein the content event defines a television channel, a date, and a scheduled start time;
  in response to the received sports wager data, authorizing, by the television service provider system, a user account mapped to the user for viewing the television channel for the content event based on the date and the scheduled start time;
  creating an entry in a database indicating the television channel and a time period of access authorized for the user account;
  permitting access to the television channel during the content event; and
  after the content event ends, deauthorizing, by the television service provider system, the user account mapped to the user for viewing the television channel such that access to the television channel on which the content event was broadcast is blocked.

13. The method for authorizing content viewing of claim 12, further comprising transmitting authorized channel data for the user account to the electronic sportsbook provider system.

14. The method for authorizing content viewing of claim 13, further comprising setting, by the electronic sportsbook provider system, a minimum bet amount partially based on the authorized channel data for the user account.

15. The method for authorizing content viewing of claim 13, further comprising setting, by the electronic sportsbook provider system, odds partially based on the authorized channel data for the user account.

16. The method for authorizing content viewing of claim 12, the method further comprising:
  receiving, by the electronic sportsbook provider system, an indication from the user indicating that viewing access to the content event is desired; and
  mapping, by the electronic sportsbook provider system, the user account to the user, wherein the sports wager data corresponding to the sports wager is transmitted by the electronic sportsbook provider system to the television service provider system based at least in part on the indication from the user indicating that viewing access to the content event is desired.

17. The method for authorizing content viewing of claim 12, the method further comprising:
  receiving, by the television service provider system from the electronic sportsbook provider system, sports wager data corresponding to a plurality of sports wagers placed by the user, the plurality of sports wagers comprising the sports wager; and
  causing, by the television service provider system, a mosaic interface to be configured at a content viewing device mapped to the user account that causes a plurality of content events corresponding to the plurality of sports wagers to be output for presentation concurrently.

18. The method for authorizing content viewing of claim 12, wherein the content event indicates an end time.

19. The method for authorizing content viewing of claim 12, further comprising:
   streaming, by the television service provider system, the television channel to a television receiver device via a television distribution network, wherein the television receiver device is mapped to the user account.

20. The method for authorizing content viewing of claim 19, further comprising outputting for presentation, by the television receiver device, an indication of the sports wager placed by the user concurrently with the television channel.

* * * * *